US012688552B2

(12) United States Patent
Jung et al.

(10) Patent No.: US 12,688,552 B2
(45) Date of Patent: Jul. 21, 2026

(54) METHOD AND APPARATUS WITH ADAPTIVE SUPER SAMPLING

(71) Applicant: SAMSUNG ELECTRONICS CO., LTD., Suwon-si (KR)

(72) Inventors: Hwiryong Jung, Suwon-si (KR); Nahyup Kang, Suwon-si (KR); Hanjun Kim, Suwon-si (KR); Jaeyoung Moon, Suwon-si (KR); Hyeonseung Yu, Suwon-si (KR); Juyoung Lee, Suwon-si (KR); Inwoo Ha, Suwon-si (KR); Seokpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 482 days.

(21) Appl. No.: 18/316,120

(22) Filed: May 11, 2023

(65) Prior Publication Data
US 2024/0161236 A1 May 16, 2024

(30) Foreign Application Priority Data
Nov. 10, 2022 (KR) ........................ 10-2022-0149526

(51) Int. Cl.
*G06T 3/40* (2024.01)
*G06T 3/4053* (2024.01)
(Continued)

(52) U.S. Cl.
CPC ............ *G06T 3/4053* (2013.01); *G06T 7/248* (2017.01); *G06V 10/7515* (2022.01)

(58) Field of Classification Search
None
See application file for complete search history.

(56) References Cited

U.S. PATENT DOCUMENTS

| | | | | |
|---|---|---|---|---|
| 7,446,780 | B1 * | 11/2008 | Everitt | .................... G06T 15/50 345/611 |
| 7,643,088 | B2 | 1/2010 | Silverstein et al. | |

(Continued)

FOREIGN PATENT DOCUMENTS

| | | | | | |
|---|---|---|---|---|---|
| CN | 110458754 | A | * | 11/2019 | ............. G06N 3/084 |
| CN | 116977167 | A | * | 10/2023 | ........... G06T 3/4053 |

(Continued)

OTHER PUBLICATIONS

Kirillov et al., "Panoptic Segmentation", Publication Year: 2019, https://doi.org/10.48550/arXiv.1801.00868 (Year: 2019).*

*Primary Examiner* — Chan S Park
*Assistant Examiner* — Promotto Tajrian Islam
(74) *Attorney, Agent, or Firm* — Sughrue Mion, PLLC

(57) ABSTRACT

An adaptive super sampling method includes: rendering frames of a three-dimensional (3D) model, the frames including a current frame and a previous frame preceding the current frame; determining motion vectors indicating a correspondence relationship between pixels in the current frame and pixels in the previous frame; generating a geometric identifier maps (G-ID maps) respectively corresponding to the current frame and the previous frame based on 3D geometrical properties associated with the pixels in the current frame and the previous frame; based on the motion vectors and the G-ID maps, generating an artifact map predicting where artifacts will occur from inter-frame super sampling of the current frame; and performing adaptive super sampling on the current frame based on the artifact map.

20 Claims, 7 Drawing Sheets

(51) Int. Cl.
  *G06T 7/246*       (2017.01)
  *G06V 10/75*      (2022.01)

(56)       References Cited

U.S. PATENT DOCUMENTS

| | | | |
|---|---|---|---|
| 9,177,224 B1* | 11/2015 | Heller .................. | G06V 10/462 |
| 11,367,165 B2 | 6/2022 | Xiao et al. | |
| 2006/0114358 A1* | 6/2006 | Silverstein .............. | H04N 5/21 |
| | | | 348/E5.049 |
| 2012/0020557 A1* | 1/2012 | Gaubatz ................ | H04N 1/624 |
| | | | 382/167 |
| 2015/0379688 A1* | 12/2015 | Cheng ................... | G06T 15/005 |
| | | | 345/589 |
| 2018/0192035 A1* | 7/2018 | Dabeer ..................... | G06T 5/50 |
| 2020/0250836 A1* | 8/2020 | Li ............................. | G06T 5/30 |
| 2025/0061541 A1* | 2/2025 | Dong ................... | G06T 3/4053 |

FOREIGN PATENT DOCUMENTS

| | | | |
|---|---|---|---|
| KR | 10-2016-0001674 A | 1/2016 | |
| KR | 10-2370617 B1 | 3/2022 | |
| KR | 10-2424965 B1 | 7/2022 | |

* cited by examiner

400

METHOD AND APPARATUS WITH ADAPTIVE SUPER SAMPLING

CROSS-REFERENCE TO RELATED APPLICATIONS

This application claims the benefit under 35 USC § 119(a) of Korean Patent Application No. 10-2022-0149526, filed on Nov. 10, 2022, in the Korean Intellectual Property Office, the entire disclosure of which is incorporated herein by reference for all purposes.

BACKGROUND

1. Field

The following description relates to a method and apparatus with adaptive super sampling.

2. Description of Related Art

Super sampling may be used to reduce aliasing, which are edges of bumpy pixels in an image, also referred to as "jaggies". Super sampling may be generally used for smoothing images, e.g., images generated by computer games or other programs that produce images. Spatial antialiasing may involve using information of only a single rendered image frame (i.e., intra-frame antialiasing), whereas temporal antialiasing may involve using temporal information between rendered image frames (i.e., inter-frame anti-aliasing), and morphological antialiasing may involve estimating geometric coverage of an original pixel based on color discontinuity found near pixels in a final image frame.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an adaptive super sampling method includes: rendering frames of a three-dimensional (3D) model, the frames including a current frame and a previous frame preceding the current frame; determining motion vectors indicating a correspondence relationship between pixels in the current frame and pixels in the previous frame; generating a geometric identifier maps (G-ID maps) respectively corresponding to the current frame and the previous frame based on 3D geometrical properties associated with the pixels in the current frame and the previous frame; based on the motion vectors and the G-ID maps, generating an artifact map predicting where artifacts will occur from inter-frame super sampling of the current frame; and performing adaptive super sampling on the current frame based on the artifact map.

The generating of the G-ID map may include: associating 3D geometrical properties with the respective pixels in the current frame and the previous frame; generating G-IDs for the pixels by based on the 3D geometrical properties; and generating the G-ID map by encoding the G-IDs of the pixels.

The geometrical properties may include any one or any combination of: identification information of at least one object included in the current frame and the one or more previous frames, identification information of polygons constituting the at least one object, identification information of vertexes included in the polygons, identification information of edges included in the polygons, subdivision levels of the polygons, and identification information of sub-polygons constituting the polygons.

The generating of the artifact map may include matching pixels corresponding to a same position in the current frame and the previous frame, using the motion vectors; and generating the artifact map based on whether G-IDs of matched pixels are the same.

The matching of the pixels may include matching second pixels of the previous frame to third pixels at positions corresponding to the second pixels in a third frame obtained by warping the current frame to the previous frame using the motion vectors.

The generating of the artifact map may include assigning a first value to elements in the artifact map corresponding to first regions in which matched pixels have a same G-ID; and assigning a second value to elements in the artifact map corresponding to second regions in which matched pixels have different G-IDs.

The performing of the adaptive super sampling may include, according to the artifact map, performing inter-frame super sampling on some regions of the current frame and performing intra-frame super sampling on other regions of the current frame.

The performing of the adaptive super sampling may include: up-sampling regions of the current frame corresponding to elements of the artifact map having a first value based on the previous frame; and performing only single image super sampling on regions of the current frame corresponding to elements of the artifact map having a second value.

The up-sampling may be performed by neural super sampling using pixel values of the previous frame obtained based on the motion vectors.

The G-ID maps may be generated based on any combination of an object included in the 3D model, polygons constituting the object in the 3D model, and vertexes and edges of the polygons.

In another general aspect, an adaptive super sampling apparatus includes: one or more processors; memory storing instructions configured to cause the one or more processors to: render frames of a 3D model including a current frame and a previous frame; to determine motion vectors indicating a correspondence relationship between pixels included in the current frame and the previous frame; generate a G-ID map corresponding to the current frame and the previous frame based on 3D geometrical properties associated with the pixels in the current frame and the previous frame; based on the motion vectors and the G-ID map, generate an artifact map indicating where artifacts will occur during super sampling of the current frame; and perform adaptive super sampling on the current frame based on the artifact map.

The instructions may be further configured to cause the one or more processors to: generate the G-ID map based on geometric properties of the 3D model determined to be associated with the pixels in the current and previous frame.

The geometric properties may include any one or any combination of: information of an object included in the current frame and the previous frame, information of polygons constituting the object, information of vertexes included in the polygons, information of edges included in the polygons, subdivision levels of the polygons, and information of sub-polygons constituting the polygons.

The instructions may be further configured to cause the one or more processors to: match pixels corresponding to a same position in the current frame and the previous frame, using the motion vectors; and generate the artifact map based on whether G-IDs of the matched pixels are the same.

The instructions may be further configured to cause the one or more processors to: assign a first value to elements of the artifact map corresponding to matched pixels, in response to each of the matched pixels having the same G-ID; and assign a second value to elements of the artifact map corresponding to matched pixels having different G-IDs.

The instructions may be further configured to cause the one or more processors to: perform temporal inter-frame super sampling on only regions of the current frame corresponding elements in the artifact map having the first value.

The instructions may be further configured to cause the one or more processors to: perform intra-frame up-sampling for only regions of the current frame corresponding elements of the artifact map having the second value.

The instructions may be further configured to cause the one or more processors to: perform the temporal inter-frame super sampling by applying neural super sampling to pixel values of the previous frame.

In another general aspect, a method includes: receiving a current frame and a previous frame rendered from a 3D model; generating motion vectors based on the current frame and the previous frame; determining first associations between pixels of the current frame and 3D geometric features based on the 3D model; determining second associations between pixels of the previous frame and 3D geometric features based on the 3D model; determining which regions of the current frame to perform inter-frame super sampling on based on comparing the first associations with the second associations.

One of the regions may be determined based on corresponding pixels of the current and previous frame being determined to be associated with a same geometric feature.

Other features and aspects will be apparent from the following detailed description, the drawings, and the claims.

BRIEF DESCRIPTION OF THE DRAWINGS

Throughout the drawings and the detailed description, unless otherwise described or provided, the same or like drawing reference numerals will be understood to refer to the same or like elements, features, and structures. The drawings may not be to scale, and the relative size, propor-

Figure 1:
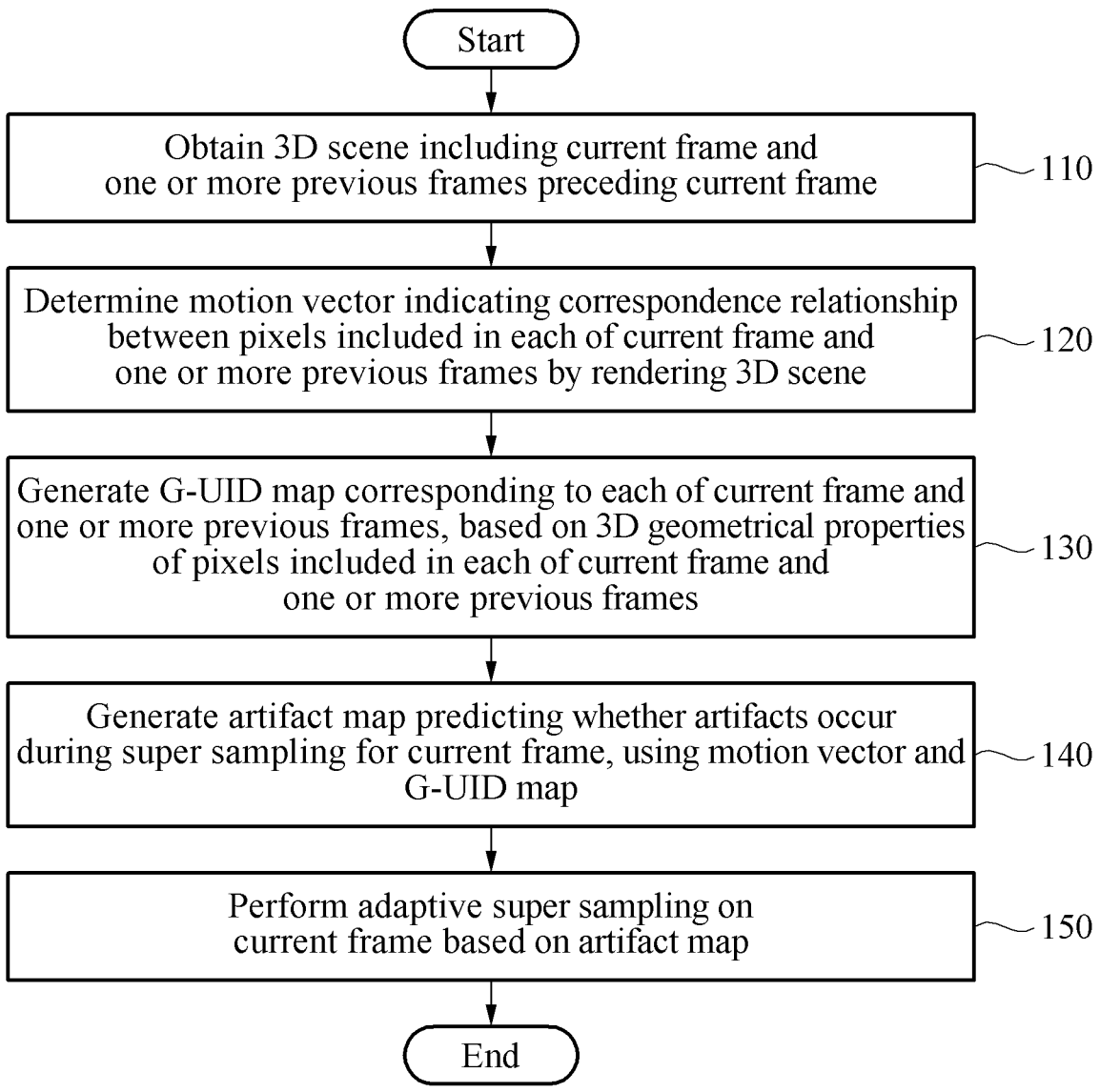
FIG. 1 illustrates an example adaptive super sampling method, according to one or more embodiments.

4 tions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example adaptive super sampling method, according to one or more embodiments. Referring to FIG. 1, an adaptive super sampling apparatus may perform adaptive super sampling on a current frame through operations 110 to 150. The adaptive super sampling apparatus may be, for example, an adaptive super sampling apparatus 500 illustrated in FIG. 5 or an adaptive super sampling apparatus 700 illustrated in FIG. 7, but is not limited thereto.

In operation 110, the adaptive super sampling apparatus obtains a three-dimensional (3D) scene including a current frame and one or more previous frames preceding the current frame. For example, when the current frame is an image frame corresponding to a time t, the one or more previous frames may be an image frame corresponding to t-1 or image frames corresponding to t-1 and t-2, respectively. The 3D scene may be, for example, a scene of a game, a scene of a movie, or a scene including 3D information (e.g., navigation information) provided by various visualization functions of an automobile infotainment system, but is not limited thereto.

The adaptive super sampling apparatus may obtain information on any one or any combination of a 3D scene, along with a camera capturing the 3D scene, at least one object included in the 3D scene, polygons constituting the at least one object, and vertexes and edges of the polygons. The information on the camera may include, for example, a focal length of the camera, a viewing angle of the camera, and pixel information of the camera, but is not necessarily limited thereto.

In operation 120, the adaptive super sampling apparatus determines motion vectors indicating correspondence relationships between pixels included in the current frame and the one or more previous frames by rendering the 3D scene obtained in operation 110. The correspondence relationship between pixels may be understood to include a matching relationship such as which pixel b of the previous frame matches pixel a of the current frame, and/or a moving distance between the pixel a and the matching pixel b.

The motion vector may define, for example, a location where a pixel visible in a current frame i appears in a previous frame i-1 without visibility and color information. Motion vectors are further described with reference to FIG. 2 below.

In operation 130, the adaptive super sampling apparatus generates geometric UID maps (G-UID maps) respectively corresponding to the current frame and the one or more previous frames, based on 3D geometrical properties of the pixels included in the current frame and the one or more previous frames.

In operation 130, the adaptive super sampling apparatus may, for example, assign identification information for each 3D geometrical property of the pixels included in each of the current frame and the one or more previous frames. The adaptive super sampling apparatus may generate a geometric UID of each pixel by concatenating or combining identification information for each 3D geometrical property of the pixels included in one frame.

The identification information for each geometrical property may include, for example, any one or any combination of identification information of at least one object included in the current frame and the one or more previous frames, identification information of the polygons constituting the at least one object, identification information of the vertexes included in the polygons, identification information of the edges included in the polygons, subdivision levels of the polygons, identification information of sub-polygons constituting the polygons, and identification information of pixels, but is not limited thereto. The 3D geometrical properties of pixels is further described with reference to FIG. 3 below. The adaptive super sampling apparatus may generate a G-UID map by encoding the geometric UIDs of respective pixels. A G-UID map corresponding to a frame is further described with reference to FIG. 4 below.

Figure 5:
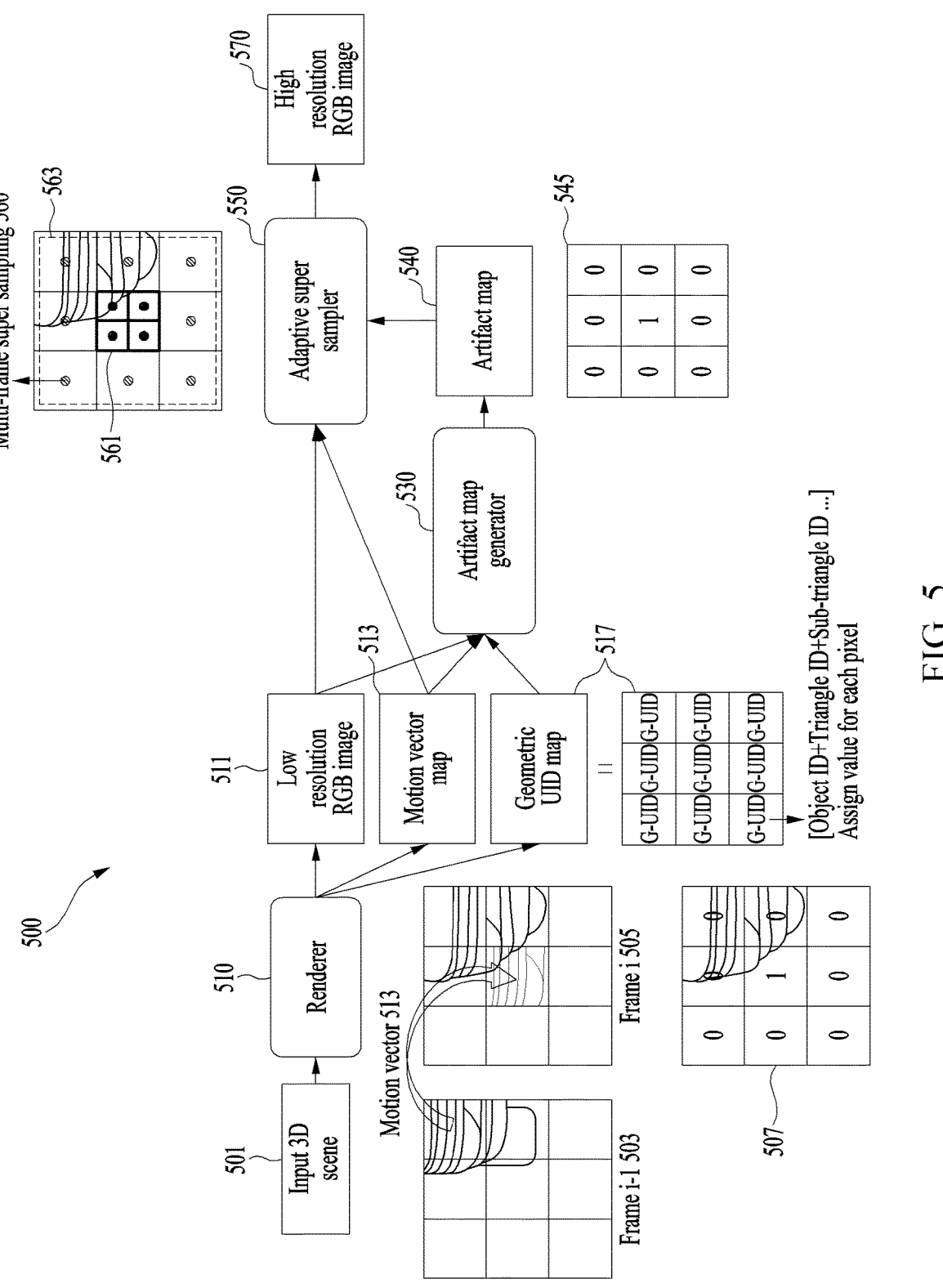
FIG. 5 illustrates an example process of performing adaptive super sampling on a 3D scene, according to one or more embodiments.

In operation 140, the adaptive super sampling apparatus generates an artifact map using the motion vectors determined in operation 120 and the G-UID maps generated in operation 130. The artifact map may predict whether artifacts occur during super sampling for the current frame. An example artifact map 545 is illustrated in FIG. 5 below.

In operation 140, the adaptive super sampling apparatus may match pixels corresponding to the same position in each of the current frame and the one or more previous frames, using the motion vectors. The adaptive super sampling apparatus may match, for example, second pixels of one or more previous frames to third pixels at positions corresponding to the second pixels in a third frame obtained by warping the current frame to one or more previous views using the motion vector. The adaptive super sampling apparatus may generate an artifact map based on whether G-UIDs of the matched equivalent pixels (e.g., second pixels of the previous frame and third pixels of the third frame) are the same. For example, when each of the matched equivalent pixels has the same G-UID, the adaptive super sampling apparatus may assign a first value to a first region in the artifact map where the matched corresponding pixels are located. The first value may be, for example, "0", but is not limited thereto. When each of the matched equivalent pixels has a different G-UID, the adaptive super sampling apparatus may assign a second value to a second region in the artifact map where the matched corresponding pixels are located. The second value may be, for example, "1", but is not limited thereto.

Each of the matched pixels having the same G-UID may indicate that there is no possibility of artifacts occurring during super sampling of the corresponding pixel. Here, the fact that an artifact is unlikely to occur may be understood to include the meaning that there is little possibility of an artifact occurring.

Also, each of the matched pixels having different G-UIDs may indicate that there is a possibility of artifacts occurring during inter-frame super sampling of the corresponding pixel. The adaptive super sampling apparatus may generate an artifact map that predicts a region in which an artifact may occur based on whether the G-UID of each pixel is the same.

In operation 150, the adaptive super sampling apparatus performs adaptive super sampling on the current frame based on the artifact map generated in operation 140. The adaptive super sampling apparatus may perform multi-frame (inter-frame) super sampling using the motion vectors on regions indicated by an artifact map as having no possibility of artifact occurrence. In addition, with respect to a region indicated by an artifact map as having the possibility of artifact occurrence, the adaptive super sampling apparatus may, for example, render the region with a native resolution that is high resolution, or perform single image super sampling on the region. Here, the native resolution may be the actual resolution of a display device displaying an image, and not the resolution of the distributed signal. In general, the closer an input signal is to its native resolution, the better the picture may be. For example, a video graphics array (VGA) (853×480) signal may couple perfectly with a display device with a native resolution of 853×480, but an XVGA (1024×768) signal may couple better with a display device with a native resolution of 1024×1024.

The adaptive super sampling apparatus may provide computational efficiency and visual quality at the same time by adaptively performing super sampling on regions of the current frame based on the artifact map. A method of the adaptive super sampling apparatus performing adaptive super sampling on a current frame is described with reference to FIG. 6 below.

Figure 2:
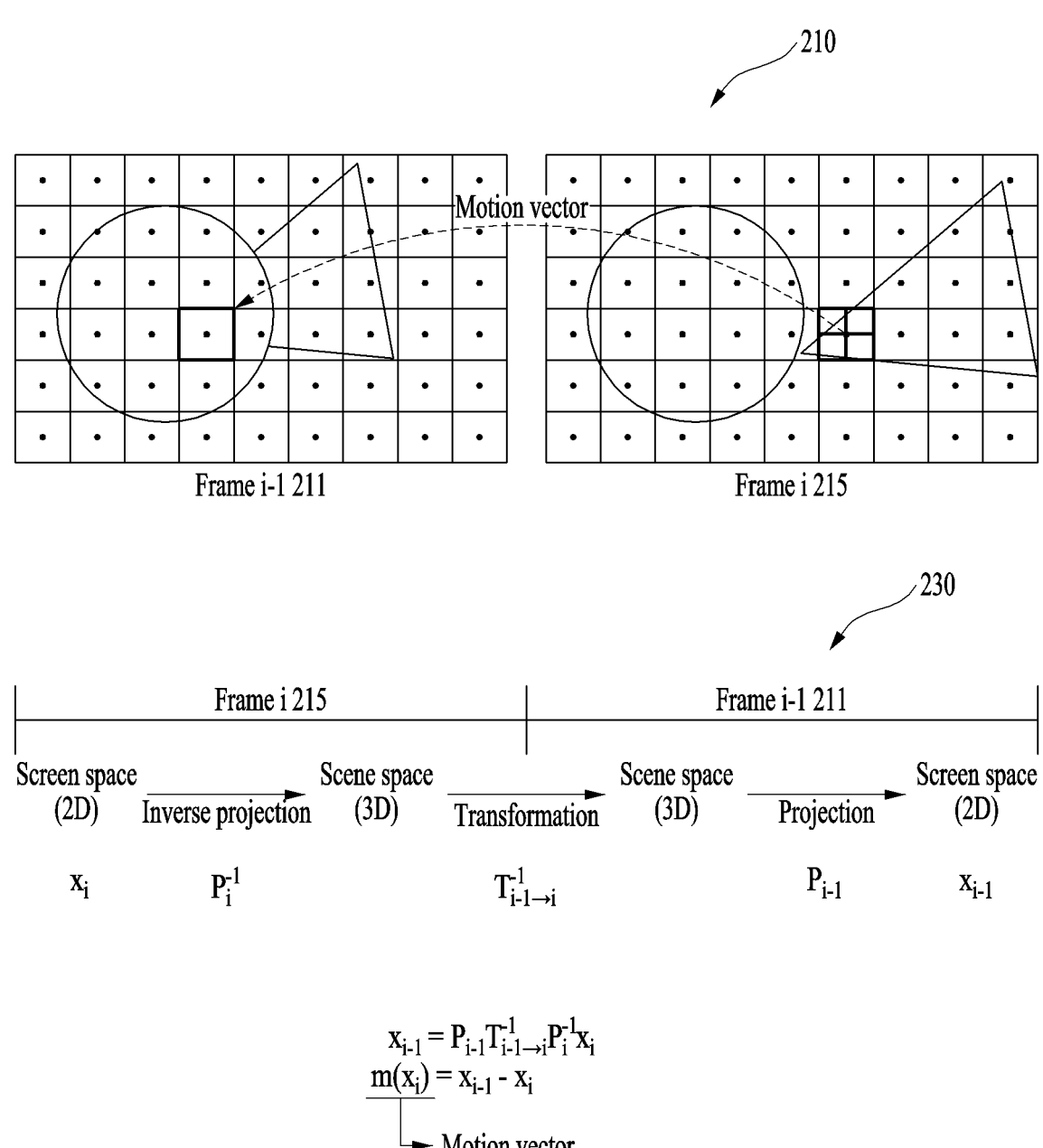
FIG. 2 illustrates an example of inter-frame pixel motion that may be represented as a motion vector, according to one or more embodiments.

FIG. 2 illustrates an example inter-frame pixel motion that may be represented as a motion vector, according to one or more embodiments. The upper part of FIG. 2 illustrates an example 210 correspondence relationship (e.g., moving distance (displacement)) between pixels in a previous frame Frame i-1 211 and pixels in a current frame Frame i 215, where the frames are in a sequence of frames generated by rendering a 3D scene. The dashed line in FIG. 2, labeled "Motion vector", indicates two pixels of the respective frames that represent a same scene point but at different locations within the respective frames due to movement of the scene. This inter-frame pixel motion may be represented as a motion vector, which can be derived with techniques described below. The lower part of FIG. 2 illustrates an example 230 of warping the current frame Frame i 215 to the previous frame Frame i-1 211 using the motion vector.

Super sampling for real-time rendering may involve warping previous frames to the current frame using motion vectors. Each motion vector may indicate which pixel of the current frame Frame i 215 matches which pixel of the previous frame Frame i-1 211 (some pixels may not have matches due to portions of the scene moving out of view). That is, each motion vector may indicate a moving distance between a first pixel of the current frame Frame i 215 and a second pixel located at a position corresponding to the first pixel in the previous frame Frame i-1 211. The set of motion vectors representing pixel motion between two frames may be stored as a motion vector map.

The adaptive super sampling apparatus may use the information of a previous frame, as represented in a motion vector map, to increase the resolution of a current frame.

Motion vectors may be used to match pixels of the current frame Frame i 215 and respective pixels of the previous frame Frame i-1 211. The adaptive super sampling apparatus may warp the current frame Frame i 215 to the previous frame Frame i-1 211 using the motion vectors to determine whether pixels of the previous frame Frame i-1 211 and pixels of the current frame Frame i 215 represent same points in the 3D scene of the frames.

Assuming a representative first pixel $x_i$ in Frame i 215 and a corresponding representative pixel $x_{i-1}$ in Frame i-1 211, the adaptive super sampling apparatus may project the first pixel $X_i$ (which is at a position corresponding to the triangle in the two-dimensional (2D) current frame Frame i 215) into a 3D space by an inverse projection function $$P_i^{-1},$$

as shown in example 230, and then warp the first pixel X to a 3D scene space corresponding to a previous view of the previous frame Frame i-1 211 by a conversion function $$T_{i-1 \to i}^{-1}.$$

The adaptive super sampling apparatus may express the first pixel $x_i$ warped to the previous view as a second pixel $x_{i-1}$ in a 2D screen space by a projection function $P_{i-1}$.

Here, the relationship between the first pixel $X_i$ of the current frame Frame i 215 and the second pixel $X_{i-1}$ of the previous frame Frame i-1 211 may be expressed by Equation 1 below.

$$x_{i-1} = P_{i-1} T_{i-1 \to i}^{-1} P_i^{-1} x_i \qquad \text{Equation 1}$$

In addition, a motion vector $m(x_i)$ between the first pixel $x_i$ of the current frame Frame i 215 and the second pixel $X_{i-1}$ of the previous frame Frame i-1 211 may be expressed by Equation 2 below.

$$M(x_i) = x_{i-1} - x_i \qquad \text{Equation 2}$$

For example, as illustrated in example 210, when pixels corresponding to the triangle are matched in the current frame Frame i 215 and the previous frame Frame i-1 211, there may be a disocclusion artifact, wherein the portion of the triangle covered by the circle in the previous frame Frame i-1 211 moves with the flow of time and therefore emerges (newly appears) in the current frame Frame i 215.

When disocclusion occurs, the pixels corresponding to the disoccluded portion of the triangle in the current frame Frame i 215 and the pixels in the previous frame Frame i-1 211 that correspond to the disoccluded portion of the triangle may point to different objects. In example 210, in the previous Frame i-1 211, the pixels corresponding to the left corner of the triangle object are actually pixels of the circle object, whereas in the current frame Frame i 215 are pixels of the triangle object. Therefore, even when information of the previous frame Frame i-1 211 (e.g., in the form of a motion vector map) is used to improve the resolution of the current frame Frame i 215 (i.e., by super sampling), colors of the different objects may be combined, which may cause undesirable artifacts when inter-frame super sampling the current frame Frame i 215.

In an example, to reduce or prevent such disocclusion artifacts, the adaptive super sampling apparatus may determine whether pixels of the previous frame Frame i-1 211 and pixels the current frame Frame i 215 point to same points in 3D space (e.g., point to the same object) by using geometric UIDs (unique identifiers) of the respective pixels. With this approach, an artifact map may be constructed which indicates such object-mismatch pixels. In addition, in an example, by using such an artifact map to determine whether pixels of the previous frame Frame i-1 211 and pixels of the current frame Frame i 215 point to different points or objects in 3D, regions in the current frame Frame i 215 to be super sampled may be distinguished from regions to be rendered with a native resolution, thereby allowing regions vulnerable to super sampling artifacts to be not super sampled (or allowing supersampling artifacts to otherwise be addressed).

Figure 3:
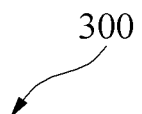
FIG. 3 illustrates example three-dimensional (3D) geometrical properties of pixels, according to one or more embodiments.
Figure 3:
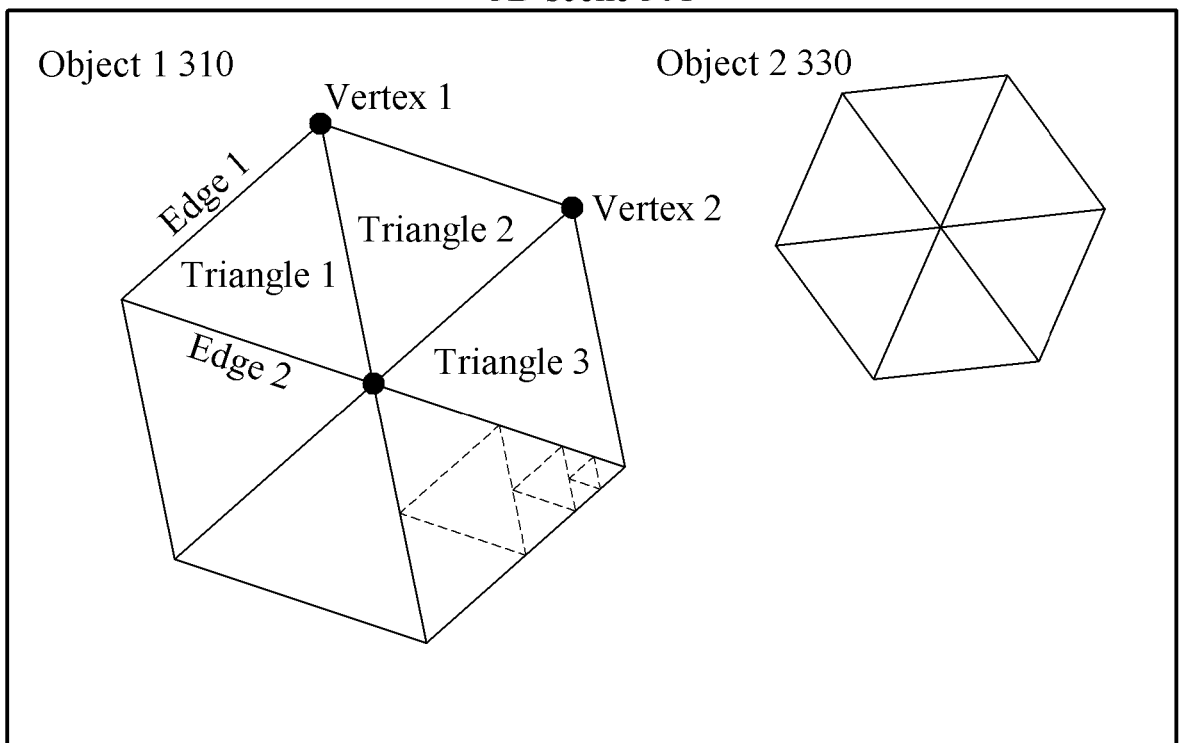
Figure 4:
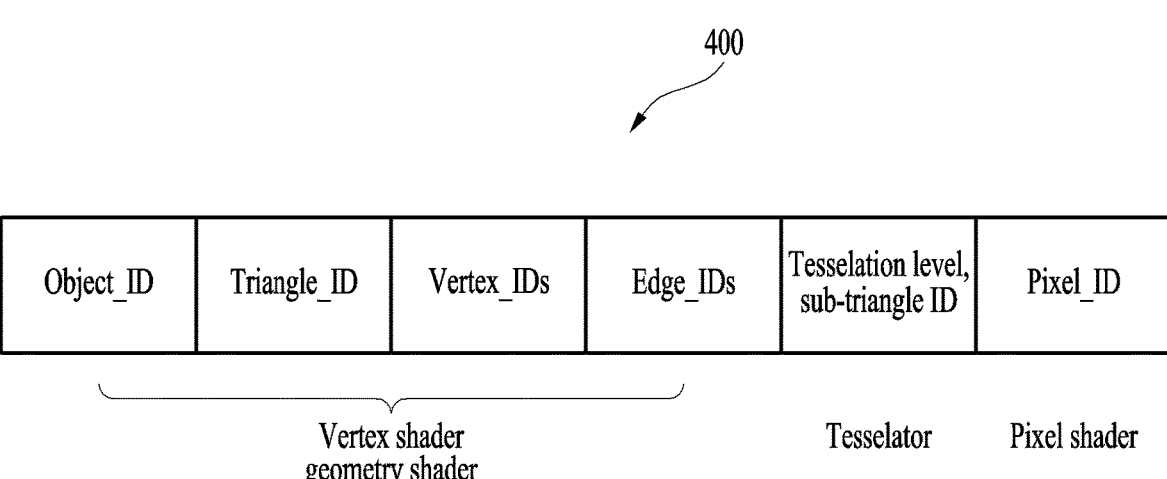
FIG. 4 illustrates an example of geometric UIDs of pixels, according to one or more embodiments.

FIG. 3 illustrates an example of 3D geometrical properties of pixels, and FIG. 4 illustrates an example of a geometric UID of each pixel, according to one or more embodiments.

Referring to FIG. 3, an example 300 of objects (object 1 310 and object 2 330) included in a 3D scene 301 is illustrated. Also, referring to FIG. 4, an example 400 of geometric UI Ds corresponding to pixels is illustrated.

Frames of the 3D scene 301 may include, for example, objects composed of various shapes and/or colors, such as people, animals, plants, automobiles, buildings, and/or backgrounds. Objects may be modeled as, for example, polygons (e.g., triangles) of various shapes. Objects may be modeled in other ways, for example, as Non-uniform rational basis spline (NURBS), as sets of points in a point cloud, etc. Similarly, pixels in 3D may be voxels or similar atomic 3D units.

The adaptive super sampling apparatus may assign (or acquire) identification information for 3D geometrical properties of pixels included in each of the frames (e.g., a current frame and one or more previous frames) of the 3D scene 301 to generate a geometric UID for each pixel. With this information, the adaptive super sampling apparatus may easily determine whether a pixel of a previous frame and a pixel of a current frame (e.g., two pixels potentially paired by a motion vector) of the 3D scene 301 point to the same point in 3D by using the geometric UID of each pixel. Whether the geometric UIDs are the same may determine how or whether either or both pixels are used for super sampling.

The 3D geometrical properties to be associated with the pixels may include, for example, the objects 310 and 330 represented by (or rendered for) the corresponding pixels, the polygons constituting the objects 310 and 330, the vertexes and edges of the polygons, subdivision levels of the polygons, and/or sub polygons into which the polygons are subdivided, but are not limited thereto. In FIG. 3, a case in which the polygons are triangles is described as an example, but polygons may have various shapes other than triangles, such as rectangles, pentagons, hexagons, octagons, and/or circles.

As noted, the adaptive super sampling apparatus may assign identification information of 3D geometrical properties of pixels. The identification information may include, for example, any one or any combination of identification information (object ID) of at least one object included in the current frame and the one or more previous frames, identification information (triangle ID) of the polygons constituting the at least one object, identification information (vertex ID) of the vertexes included in the polygons, identification information (edge ID) of the edges included in the polygons, subdivision levels (tessellation level) of the polygons, identification information (sub triangle ID) of sub-polygons constituting the polygons, and/or identification information (pixel ID) of pixels, identification of a NURB (or other mathematically defined object), but is not limited thereto. The identification information may further include, for example, identification information corresponding to positions of vertexes, colors of vertexes, and/or texture coordinates of vertexes. The identification information may identify any information in a 3D scene representation (e.g., a 3D model) that can be associated with a pixel rendered for the 3D scene.

The adaptive super sampling apparatus may generate, for example, as illustrated in example 400, geometric UI Ds of respective pixels by, for any pixel, combining identification information for 3D geometrical properties associated with the pixel into one unit or record, and the geometric feature information may be linked to or associated with a pixel by including a pixel ID (Pixel_ID) with the geometric feature information. The geometric UID may include information capable of uniquely distinguishing 3D points that may be sampled in a 3D scene (or in a portion of a 3D scene). The adaptive super sampling apparatus may determine whether pixels warped (or to be warped) from a previous frame to a current frame correspond to the same 3D point (or object) by using their respective geometric UIDs (G-UIDs). The geometric UID of each pixel may correspond to unique identification information such as an address or number assigned to each 3D point. In addition, the geometric UID may be used to identify a position of a 3D object corresponding to a pixel.

The adaptive super sampling apparatus may generate a G-UID map by encoding the geometric UI Ds of respective pixels.

An example of the G-UID map may refer to a G-UID map 517 illustrated in FIG. 5. The G-UID map 517 may store position information of pixels on a 3D object in the form of a map.

FIG. 5 illustrates an example process of performing adaptive super sampling on a 3D scene, according to one or more embodiments. Referring to FIG. 5, an adaptive super sampling apparatus 500 may include, for example, a renderer 510, an artifact map generator 530, and an adaptive super sampler 550.

As a 3D scene 501 is accessed for rendering thereof, the renderer 510 may generate various 2D images from the 3D scene 501. The 3D scene 501 may include, for example, information such as polygons constituting objects included in the scene, vertexes and edges of the polygons, object animation, and camera animation, for example.

The 2D images generated by the renderer 510 may include, for example, a low resolution RGB image 511, a normal map, a depth map, a motion vector map 513, the G-UID map 517 and the like, but is not necessarily limited thereto (as used herein "low resolution" and the like, and "high resolution" and the like, are used to indicate relative resolution and do not imply any particular resolutions). The G-UID map 517 may map geometric UIDs (in which identification information for each 3D geometrical property of a corresponding pixel is combined) to respective pixels.

The artifact map generator 530 may generate an artifact map 540 by comparing the geometric UIDs of pixels of a previous frame 503 with the geometric UIDs of pixels of a warped image 507 to determine which are the same or not (the warped image 507 is generated by warping a current frame 505 to the previous frame 503 using the motion vector map 513). When a pixel of the warped image 507 and a pixel of the previous frame 503 have the same geometric UID, the artifact map generator 530 may assign "0" for a region corresponding to the pixel of the warped image 507 (which also corresponds to a same region of the previous frame 503). When the pixel of the warped image 507 and the pixel of the previous frame 503 have different geometric UIDs, the artifact map generator 530 may assign "1" for a region corresponding to the pixel of the warped image 507. Thus, an artifact map 545 (a scalar map) may be generated that corresponds to the pixels of the warped image 507. The artifact map 545 is an example of an artifact map 540. The artifact map 545 and the G-UID map 517 may have varying resolutions. In some implementations, they may have the same resolution, and in other implementations they may have different resolutions (e.g., the artifact map 545 may be coarser). Moreover, the artifact map 545 and the G-UID map 517 may have the same or different resolutions as the frames being rendered (before being super sampled).

The artifact map 540 may act as a mask that controls upsampling of regions of the current frame. The adaptive super sampler 550 may up-sample regions 563 of the current frame corresponding to first regions in the artifact map 540 having a first value (e.g., "0"). The up-sampling may be performed by any suitable means, for example, by multiframe (or inter-frame) super sampling, as illustrated in example 560. Alternatively, the adaptive super sampler 550 may up-sample the first regions of the current frame (corresponding "0" in the artifact map 540) by, for example, a neural super sampling technique using pixel values of one or more previous frames 503 corresponding to the current frame, where the pixel values are obtained based on the motion vectors in the motion vector map.

The adaptive super sampler 550 may perform singleimage (intraframe) super sampling on second regions 561 of the current frame that are regions corresponding to "1" in the artifact map 545, at a target resolution of the overall super sampling process.

The artifact map 540 may be used in other ways for super sampling. For example, in some implementations, the regions indicated as having artifacts by the artifact map 540 may not be up-sampled at all.

The adaptive super sampling apparatus 500 may obtain a high-resolution RGB image 570 of the current frame through the super sampling process described above.

The adaptive super sampling apparatus 500 may prevent artifacts (e.g., ghosting effects) from occurring during super sampling through adaptive super sampling based on the artifact map 540.

Figure 6:
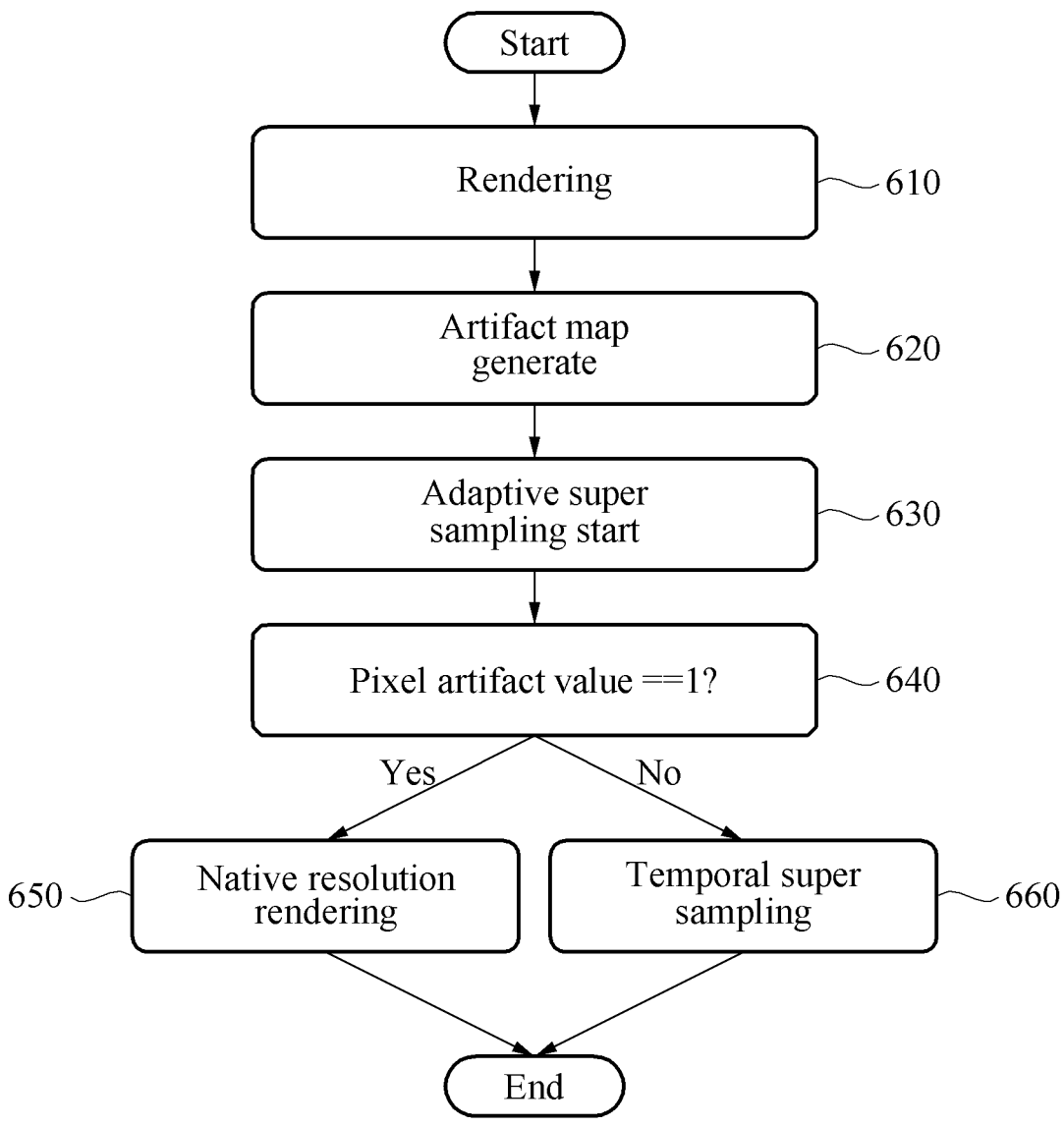
FIG. 6 illustrates an example method of performing adaptive super sampling, according to one or more embodiments.

FIG. 6 illustrates an example method of adaptive super sampling, according to one or more embodiments.

Referring to FIG. 6, the adaptive super sampling apparatus may perform adaptive super sampling through operations 610 to 660.

In operation 610, the adaptive super sampling apparatus may perform rendering on an input 3D scene.

In operation 620, the adaptive super sampling apparatus may generate an artifact map indicating regions where artifacts might occur if inter-frame super sampling were performed for a current frame using a motion vector; the artifact map may be obtained based on a G-UID map obtained during the rendering in operation 610.

In operation 630, the adaptive super sampling apparatus may start adaptive super sampling using the artifact map generated in operation 620. Specifically, in operation 640, the adaptive super sampling apparatus may determine, for each element of the artifact map 540, whether an artifact value of the element in the artifact map is "1" ("1" indicating a region in which artifacts are predicted to occur from inter-frame based super sampling of a corresponding region of the current frame).

For example, when it is determined in operation 640 that the artifact value of an element in the artifact map is "1", in operation 650, the adaptive super sampling apparatus may perform rendering on a region of the current frame corresponding to the position of the element in the artifact map containing "1" at high resolution (e.g., a native resolution of a display device displaying the up-sampled frames), e.g., using intra-frame up-sampling (e.g., by pixel interpolation).

In contrast, in operation 660, when it is determined in operation 640 that the artifact value of a corresponding element in the artifact map is not "1", (the artifact is "0"), the adaptive super sampling apparatus may perform temporal (inter-frame) super sampling on a region of the current frame corresponding to the position of the element in the artifact map containing "0". Temporal super sampling may be understood to have the same meaning as multi-frame super sampling.

In operation 660, the adaptive super sampling apparatus may up-sample a region of a current frame through a neural super sampling technique on the region of the current frame corresponding to the position of the artifact map element containing "0". Neural super sampling may be a technique in which a high-resolution image of a current frame is inferred by a neural network using, for example, pixel values of one or more previous frames corresponding to the lowresolution current frame that are obtained based on motion vectors.

Figure 7:
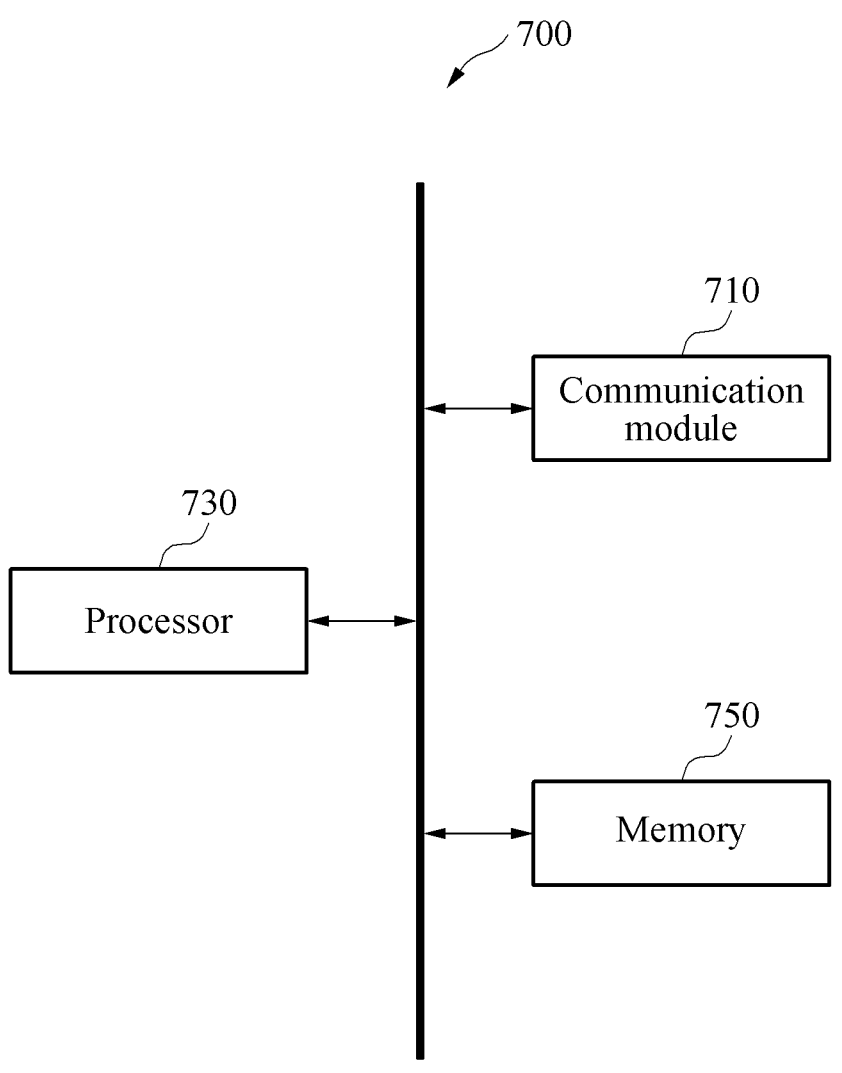
FIG. 7 illustrates an example adaptive super sampling apparatus, according to one or more embodiments.

FIG. 7 illustrates an example adaptive super sampling apparatus, according to one or more embodiments. Referring to FIG. 7, an adaptive super sampling apparatus 700 may include a communication module 710, a processor 730, and a memory 750.

The communication module 710 may receive a 3D scene including a current frame and one or more previous frames preceding the current frame.

The processor 730 may render the 3D scene received via the communication module 710 and determine a motion vector indicating a correspondence relationship between pixels included in each of the current frame and the one or more previous frames. The processor 730 may generate a G-UID map corresponding to each of the current frame and the one or more previous frames based on 3D geometrical properties of the pixels included in each of the current frame and the one or more previous frames. The processor 730 may generate an artifact map indicating where artifacts from inter-frame super sampling are predicted to occur for the current frame according to the motion vectors and the G-UID map. The processor 730 may perform adaptive super sampling on the current frame based on the artifact map.

The processor 730 may execute a program (in the form of processor-executable instructions) and control the adaptive super sampling apparatus 700. Code of the program to be executed by the processor 730 may be stored in the memory 750.

In addition, the processor 730 may perform at least one method described with reference to FIGS. 1 to 6 or a scheme corresponding to the at least one method. The processor 730 may be, for example, a mobile application processor (AP), but is not limited thereto. The processor 730 (for adaptive super sampling) may be implemented by hardware including a circuit having a physical structure to perform desired operations. For example, the desired operations may include code or instructions included in a program. The processor 730 may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), a neural processing unit (NPU), or combinations thereof.

The memory 750 may store at least one program in the form of instructions. The memory 750 may store a variety of information generated from processing by the processor 730. The memory 750 may store a 3D model, identification information for each 3D geometrical property of pixels included in each frame, a G-UID map corresponding to each frame, and/or an artifact map. In addition, the memory 750 may store a variety of data and programs. The memory 750 may be a volatile memory or a non-volatile memory. The memory 750 may include a large-capacity storage medium such as a hard disk to store a variety of data.

The computing apparatuses, the electronic devices, the processors, the memories, the displays, the information output system and hardware, the storage devices, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An adaptive super sampling method, the method comprising:
   rendering frames of a three-dimensional (3D) object, the frames comprising a current frame and a previous frame preceding the current frame;
   determining motion vectors indicating a correspondence relationship between pixels in the current frame and pixels in the previous frame;
   generating first and second geometric identifier maps (G-ID maps) respectively corresponding to the current frame and the previous frame based on geometric elements of the 3D object that are associated with the pixels in the current frame and the previous frame, each G-ID map comprising identifiers of the geometric elements of the 3D object;
   based on the motion vectors and the first and second G-ID maps, generating an artifact map predicting where artifacts will occur from inter-frame super sampling of the current frame; and
   performing adaptive super sampling on the current frame based on the artifact map.

2. The method of claim 1, wherein the generating of the first and second G-ID maps comprises:
   determining associations between the geometrical elements and the pixels in the current frame and the previous frame;
   generating G-IDs for the pixels by based on the 3D-geometrical elements; and
   generating the first and second G-ID maps by encoding the G-IDs of the pixels of the current and previous frame.

3. The method of claim 2, wherein the identifiers of the geometrical elements comprises any one or any combination of:
   identification information of at least one object comprised in the current frame and the previous frames, identification information of polygons constituting the at least one object, identification information of vertexes comprised in the polygons, identification information of edges comprised in the polygons, subdivision levels of the polygons, and identification information of sub-polygons constituting the polygons.

4. The method of claim 1, wherein the generating of the artifact map comprises:
   matching pixels corresponding to a same position in the current frame and the previous frame, using the motion vectors; and
   generating the artifact map based on whether G-IDs of matched pixels in the first and second G-ID maps are the same.

5. The method of claim 4, wherein the matching of the pixels comprises:
   matching second pixels of the previous frame to third pixels at positions corresponding to the second pixels in a third frame obtained by warping the current frame to the previous frame using the motion vectors.

6. The method of claim 4, wherein the generating of the artifact map comprises:
   assigning a first value to elements in the artifact map corresponding to first regions in which matched pixels have a same G-ID; and
   assigning a second value to elements in the artifact map corresponding to second regions in which matched pixels have different G-IDs.

7. The method of claim 1, wherein the performing of the adaptive super sampling comprises:
   according to the artifact map, performing inter-frame super sampling on some regions of the current frame and performing intra-frame super sampling on other regions of the current frame, wherein the artifact map controls which regions are inter-frame super sampled and which regions are intra-frame super sampled.

8. The method of claim 1, wherein the performing of the adaptive super sampling comprises:
   up-sampling, using pixel values of the previous frame, regions of the current frame corresponding to elements of the artifact map having a first value; and
   performing only single image super sampling on regions of the current frame corresponding to elements of the artifact map having a second value.

9. The method of claim 8, wherein the up-sampling is performed by neural super sampling using the pixel values of the previous frame obtained based on the motion vectors.

10. The method of claim 1, wherein the first and second G-ID maps are generated based on any combination of: an object comprised in the 3D object, polygons constituting the object in the 3D object, and vertexes and edges of the polygons.

11. An adaptive super sampling apparatus, the apparatus comprising:
   one or more processors;
   memory storing instructions configured to cause the one or more processors to:
      render frames of a 3D medel object including a current frame and a previous frame;
      to determine motion vectors indicating a correspondence relationship between pixels comprised in the current frame and the previous frame;
      generate a first G-ID map and a second G-ID map respectively corresponding to the current frame and the previous frame based on geometric properties elements of the 3D object associated with the pixels in the current frame and the previous frame, each G-ID map comprising identifiers of the geometric elements of the 3D object;
      based on the motion vectors and the first and second G-ID maps, generate an artifact map indicating where artifacts will occur during super sampling of the current frame; and perform adaptive super sampling on the current frame based on the artifact map.

12. The apparatus of claim 11, wherein the instructions are further configured to cause the one or more processors to:

generate the first and second G-ID maps based on which of the geometric elements of the 3D object are determined to be associated with which of the pixels in the current and previous frame.

13. The apparatus of claim 12, wherein the identifiers of the geometric elements comprise any one or any combination of:

information of an object comprised in the current frame and the previous frame, information of polygons constituting the object, information of vertexes comprised in the polygons, information of edges comprised in the polygons, subdivision levels of the polygons, and information of sub-polygons constituting the polygons.

14. The apparatus of claim 11, wherein the instructions are further configured to cause the one or more processors to:

match pixels corresponding to a same position in the current frame and the previous frame, using the motion vectors; and generate the artifact map based on whether G-IDs of the matched pixels in the first and second G-ID maps are the same.

15. The apparatus of claim 11, wherein the instructions are further configured to cause the one or more processors to:

assign a first value to elements of the artifact map corresponding to matched pixels, in response to each of the matched pixels having the same G-ID; and assign a second value to elements of the artifact map corresponding to matched pixels having different G-IDs.

16. The apparatus of claim 15, wherein the instructions are further configured to cause the one or more processors to:

perform temporal inter-frame super sampling on only regions of the current frame corresponding elements in the artifact map having the first value.

17. The apparatus of claim 16, wherein the instructions are further configured to cause the one or more processors to:

perform intra-frame up-sampling for only regions of the current frame corresponding elements of the artifact map having the second value.

18. The apparatus of claim 16, wherein the instructions are further configured to cause the one or more processors to:

perform the temporal inter-frame super sampling by applying neural super sampling to pixel values of the previous frame.

19. A method comprising:

receiving a current frame and a previous frame rendered from a 3D object comprising data;

generating motion vectors based on the current frame and the previous frame;

determining first associations between pixels of the current frame and identifiers of 3D geometric elements of the 3D object;

determining second associations between pixels of the previous frame and the identifiers of the geometric elements of the 3D object;

determining which regions of the current frame to perform inter-frame super sampling on based on comparing the first associations with the second associations.

20. The method of claim 19, wherein one of the regions is determined based on corresponding pixels of the current and previous frame being determined to be associated with a same geometric element identifier.

* * * * *